US006877764B2

(12) United States Patent
Sagol

(10) Patent No.: US 6,877,764 B2
(45) Date of Patent: Apr. 12, 2005

(54) HAND TRUCK

(75) Inventor: Sami Sagol, Ramat Hasharon (IL)

(73) Assignee: Keter Plastic Ltd., Herzelyia (IL)

( * ) Notice: Subject to any disclaimer, the term of this patent is extended or adjusted under 35 U.S.C. 154(b) by 0 days.

(21) Appl. No.: 10/178,926

(22) Filed: Jun. 25, 2002

(65) Prior Publication Data

US 2003/0234517 A1 Dec. 25, 2003

(51) Int. Cl.[7] .................................................. B62B 1/00

(52) U.S. Cl. ................................ 280/655.1; 280/79.11; 280/655; 280/47.371

(58) Field of Search .............................. 280/655.1, 651, 280/655, 47.34, 47.35, 47.371, 79.11; 403/83, 84, 85, 102, 94, 96, 97, 98

(56) References Cited

U.S. PATENT DOCUMENTS 3,762,739 A * 10/1973 Tabet .................... 280/47.371
4,277,075 A * 7/1981 Shay ....................... 280/47.36
4,637,626 A * 1/1987 Foss et al. .................. 280/655
5,816,604 A * 10/1998 Hsieh et al. ............. 280/655.1
5,911,424 A * 6/1999 Rovinsky ................. 280/79.11
6,024,376 A 2/2000 Golichowski et al.
6,079,941 A * 6/2000 Lee ............................ 414/812
6,102,432 A * 8/2000 Cheng ........................ 280/642
6,345,828 B1 * 2/2002 Pool et al. ................. 280/32.6
6,375,202 B2 * 4/2002 Weck et al. ............. 280/47.35
6,386,560 B2 * 5/2002 Calender ................. 280/47.34
6,474,665 B1 * 11/2002 Fink et al. ................. 280/79.2
6,488,304 B2 * 12/2002 Krawczyk ................... 280/408
6,536,796 B1 * 3/2003 Solomon .................... 280/651

* cited by examiner

*Primary Examiner*—Christopher P. Ellis
*Assistant Examiner*—Brian L Swenson
(74) *Attorney, Agent, or Firm*—Browdy and Neimark, P.L.L.C.

(57) ABSTRACT

A hand truck comprising a platform fitted at opposed side walls thereof with a handle-engaging assembly, and a handle assembly comprising two parallel spaced arms, each fitted at its lower end with a platform engaging assembly. The handle is displaceable between three respective positions, namely a first position in which the handle is substantially up-right and which position is a pull/push position, a second position in which the handle is inclined and useful as a push position, and a third position in which the handle is and slidably received within the platform.

38 Claims, 6 Drawing Sheets

HAND TRUCK

FIELD OF THE INVENTION

This invention relates to a hand truck. More specifically the invention is concerned with a hand truck fitted with a handle displaceable between several respective positions. Such hand trucks are often referred to also as platform trucks, trolleys and work carts, and at a folded position of the handle are referred to as dollies.

BACKGROUND OF THE INVENTION

A typical hand truck typically comprises an item-supporting platform, usually rectangular and having a flat item-supporting surface, which platform is mounted on several casters and is fitted with a handle for manipulating the hand truck. Such hand trucks have long been known.

In most such hand trucks, the handles are permanently positioned in a so-called upright, or generally vertical position. While this configuration allows the user to move the truck, it has been found that it causes several problems. First, if the user is pushing the hand truck, to avoid having his feet hit the back of the platform, the user must stand at a distance behind it, resulting in extra effort and potential back strain while reaching for the handle when pushing the truck. Second, while pulling the hand truck (while hands are at the back of the operator), the handle orientation often causes the heels of the user to be clipped by the platform of the hand truck. Finally, such trucks do not provide a readily solution for storage in a compact space when not in use, primarily because of the upright handle.

While some efforts have been made to provide an adjustable handle for hand trucks, particularly in those made of metal, such have proved to be cumbersome, heavy and expensive to manufacture, and require several uniquely configured and awkwardly positioned components which could add to the potential for injury or irritation to the feet of the user.

In an attempt to solve the storage problem, some hand trucks have been provided with removable handles. Such, however, not only requires an extra mechanical step for the user to disassemble and later assemble the unit, but also requires the ultimate storage of two components. Other solutions to the storage problem involve the folding of the handle down onto the platform. However, in the folded position, the handle interferes with the potential to place items on the platform and does not allow the truck to be used as a dolly, i.e. handless.

U.S. Pat. No. 6,024,376 discloses a platform truck including a base member having a top surface to receive items thereon, a handle assembly pivotally carried by the base member and positionable in a generally upright position for pushing the base member, a generally outward position for pulling the base member, and a generally horizontal position generally flush with the top surface of the base member. Opposed side wall assemblies extend generally vertically downwardly from the top surface and have opposed depressions such that when the handle assembly is in the generally horizontal position, the latch assembly holds the arms of the handle, which can be grasped at the location of at least one of the depressions for carrying the platform truck. That patent is also concerned with the casters, some of which being manipulable for unidirectional movement or fully swivellable movement.

It is thus an object of the present invention to provide a hand truck with a handle that can be readily be displaced into different positions to facilitate pushing, pulling, storing and carrying the hand truck at various respective positions.

The present invention aims at a hand truck comprising a platform fitted with casters, and a handle assembly comprising two parallel spaced arms, each arm fitted at a lower end with a platform engaging assembly; said handle assembly being displaceable between a substantially up-right position being a pull/push position, an inclined pulling position, and a dolly position in which the handle arms are slidably received within the platform.

SUMMARY OF THE INVENTION

The present invention calls for a hand truck comprising a platform fitted at opposed side walls thereof with a handle-engaging assembly; and a handle assembly comprising two parallel spaced arms, each fitted at its lower end with a platform engaging assembly; said handle displaceable between three respective positions: a first position in which the handle is substantially up-right and which position is a pull/push position, a second position in which the handle is inclined and useful as a pulling position, and a third position in which the handle is and slidably received within the platform.

According to the present invention, the hand truck comprises a platform having two side walls extending between a fore end and a rear end, and a top item-receiving surface; two parallel arm receiving recesses, one adjacent each side wall; and an arm connector at a rear end of each side wall for pivotally arresting a lower end of a respective arm at the respective first and second positions and to facilitate sliding of the arm into the third position.

According to a design of the invention, each of the arm connectors is formed with an arm coupler and an arced path formed with two pin arresting recesses for arresting a position pin of an arm of the handle, said recesses corresponding with the first and second positions of the arm. The arm connectors are further formed with an arm supporting portion such that when the hand truck is pushed while the handle is at its first position, a corresponding portion of the arm bears against the arm supporting portion. Typically, said arm supporting portion is a wall surface. The arrangement is such that when the handle is at its first position, it is parallel and in close proximity with said wall surface.

According to a particular design of the invention, the arced path extends from a lower end opposite and in continuation with a corresponding arm receiving recesses of the platform such that; said arced path has an altering radius wherein at least at said lower end and at said two pin arresting recesses the radius is substantially similar.

The handle is typically U-shaped and each arm is fitted at its lower end with an extractable hinging member and a laterally projecting position pin slidable within the arced path and engageable with the pin arresting recesses at either of the respective first and second positions. The hinging member is preferably spring biased and is formed with a pivot joint pivotally engageable by the arm coupler of the arm connector and slidable within the arm receiving recesses.

According to a modification of the invention, the joint coupling between the arm coupler and the pivot joint of an arm is a floating joint, such that the center of rotation of an arm is dynamic and changes during shifting the handle between its respective positions.

According to one embodiment of the invention, the arm coupler of the arm connector comprises two arresting locations: a first arresting location adapted for arresting a first pivot joint of an arm at either of the positions where the hinging member is retracted, and a second arresting location adapted for arresting a second pivot joint when the hinging member is extracted. The pivot joints of hinging member spontaneously engage and disengage from the respective arresting locations upon shifting the arm between its respective positions.

According to one specific design of that embodiment, the first arresting location is an arced surface of the arm connector and the corresponding first pivot joint is a mating cylindrical portion pivotally bearing against said arced surface. The second arresting location is a joint nesting recess below said arced surface pivotally receiving a pivot projection constituting the second pivot joint.

According to a particular embodiment, at least one of the arms is fitted at its lower end with a bracket projecting from the pivot joint and being pivotally engageable within a corresponding recess of arm connector, so as to prevent unintended disengagement of the arm from the arm connector.

Preferably, the platform is provided with at least two hand grips, in the form of through-going openings, or depressions at a bottom face thereof. According to one particular embodiment, said openings intersect with the arm receiving recesses such that when the handle is received within the platform at the third position, an arm may be gripped through the opening.

Whilst it is common practice that the top item-receiving surface of the platform is flat, other embodiments as well, depending for example on the specific nature of the items to be born thereby. Furthermore, the platform is formed with several (at least three) casters to facilitate rolling the hand truck.

BRIEF DESCRIPTION OF THE DRAWINGS

In order to understand the invention and to see how it may be carried out in practice, an embodiment will now be described, by way of a non-limiting example only, with reference to the accompanying drawings, in which.

DETAILED DESCRIPTION OF A SPECIFIC EMBODIMENT

Figure 1A:
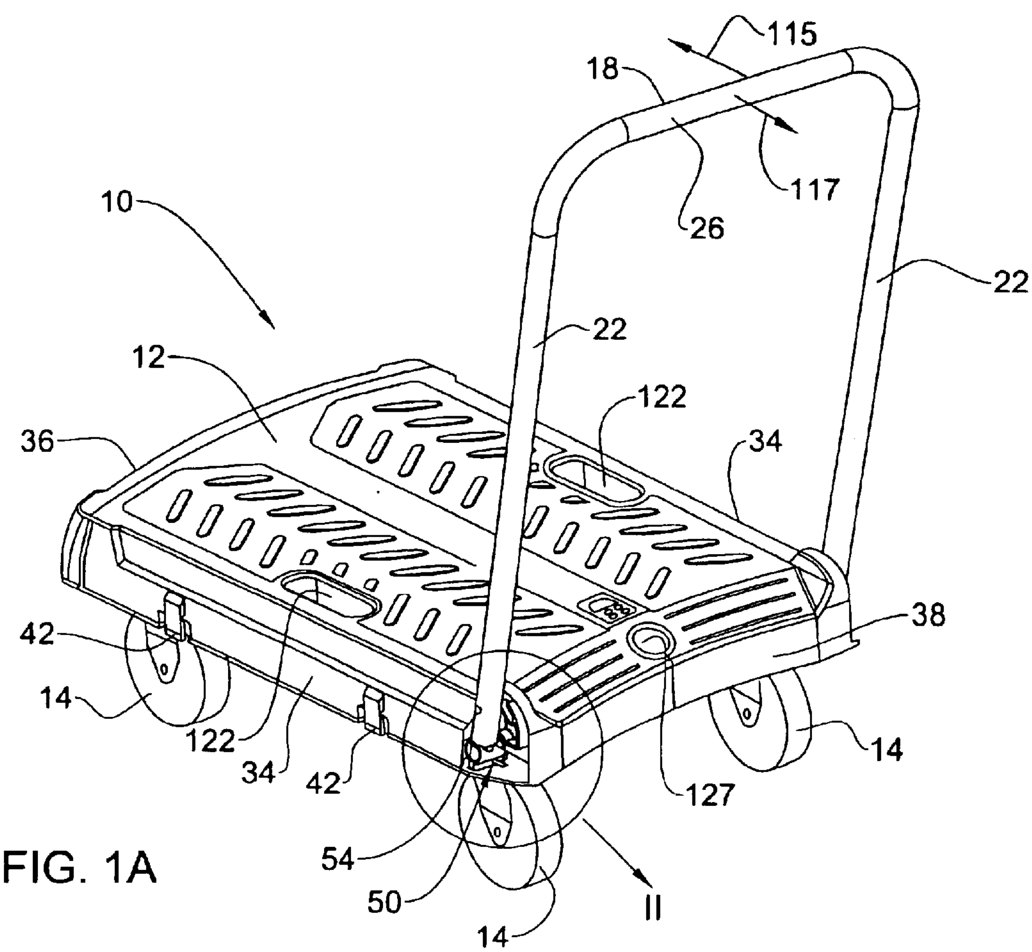
FIG. 1A is a rear isometric view illustrating the hand truck with the handle in its upright position, namely a pull/push position.
Figure 1B:
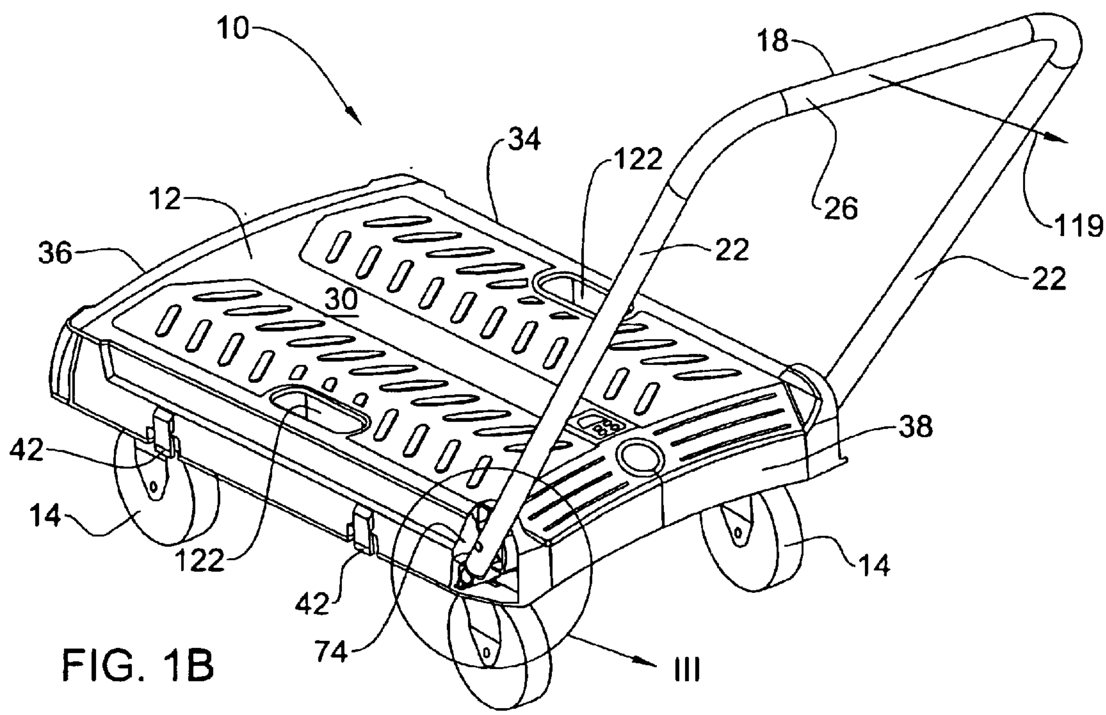
FIG. 1B is a rear isometric view of the hand truck of FIG. 1A with the handle inclined, in a pull position.
Figure 1C:
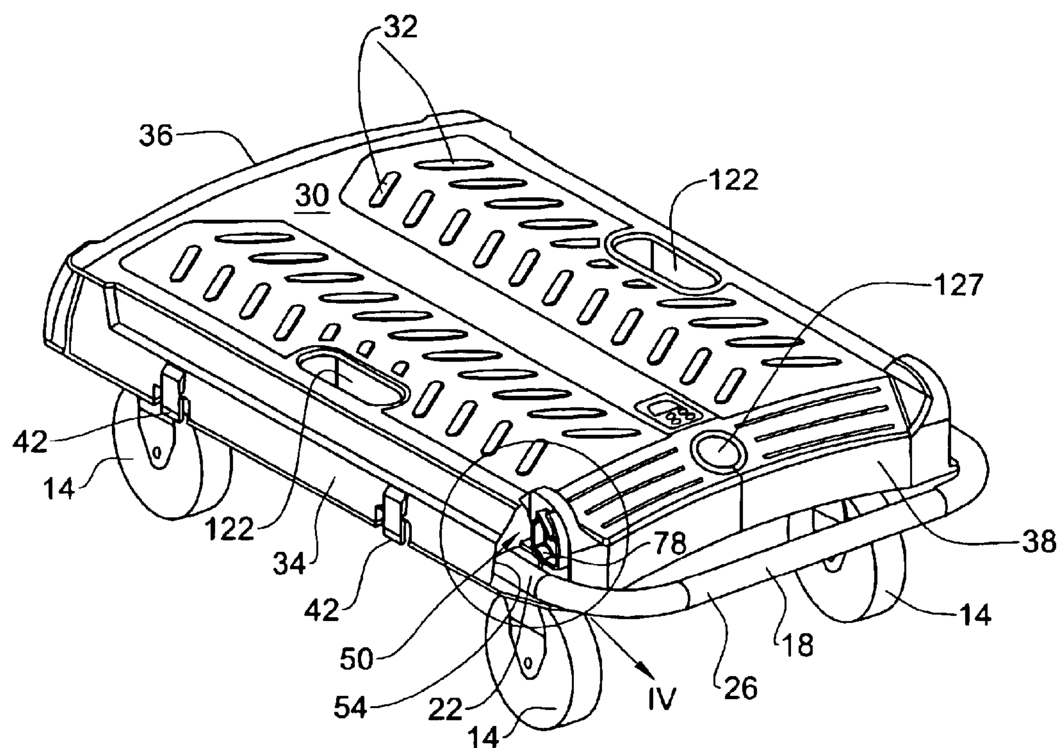
FIG. 1C is a rear isometric view of the hand truck seen in FIGS. 1A and 1B, the handle in a dolly position, namely in a horizontal position received within the platform.

Attention is first directed to FIGS. 1A to 1C illustrating a hand truck generally designated 10 comprising a generally flat platform 12 fitted with four casters 14 (only three of them seen) which are swivable or uni-directional or manipulable between these positions, as known per se. The hand truck 10 further comprises a generally U-shaped handle 18 having two parallel spaced arms 22 interconnected by a push/pull hand bar 26.

Platform 12 comprises a top surface 30 which in the present example is flat, though provided with a plurality of friction ribs 32 to improve gripping of items laid on the platform. However, it is appreciated that the top surface may have different shapes so as to correspond with different goods and equipment which may be carried by the platform. Platform 12 is formed with two side walls 34 extending between a fore end 36 and a rear end 38. As can further be seen, the side walls 34 are each fitted with two hooks 42 for attaching thereto BUNGEE cords (not shown),or other tying means, useful in securing the load or items placed on the platform 12.

Figure 3A:
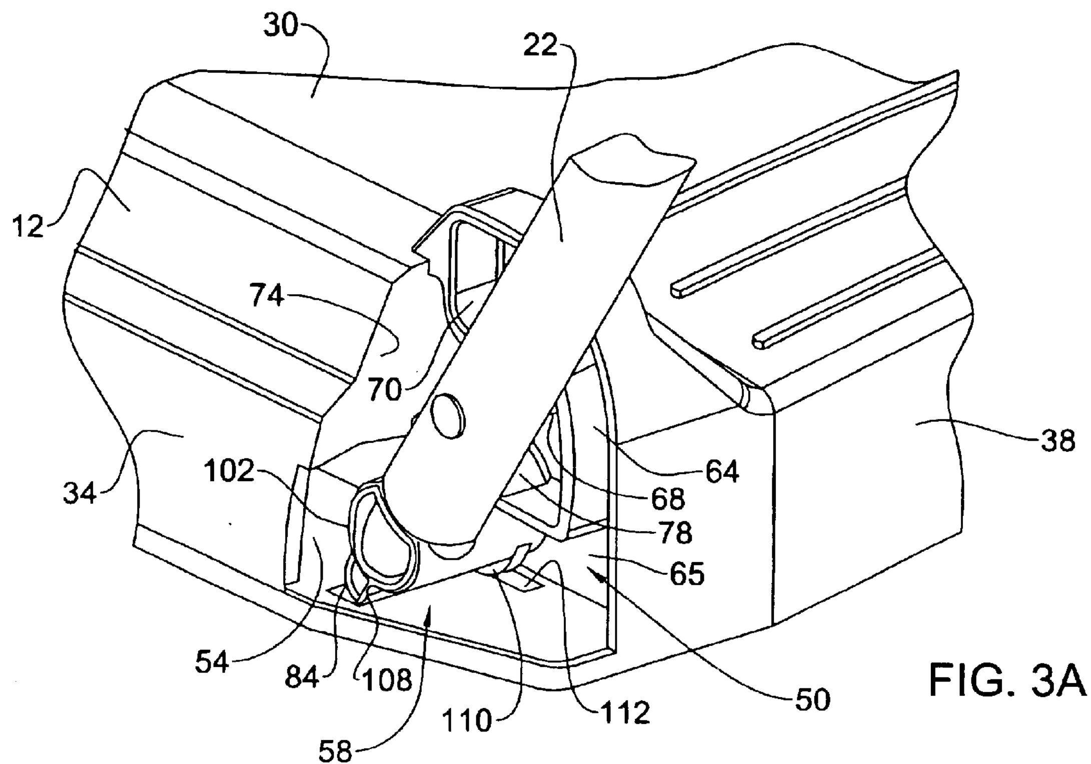
FIG. 3A is an enlargement of the portion marked III in FIG. 1B.
Figure 3B:
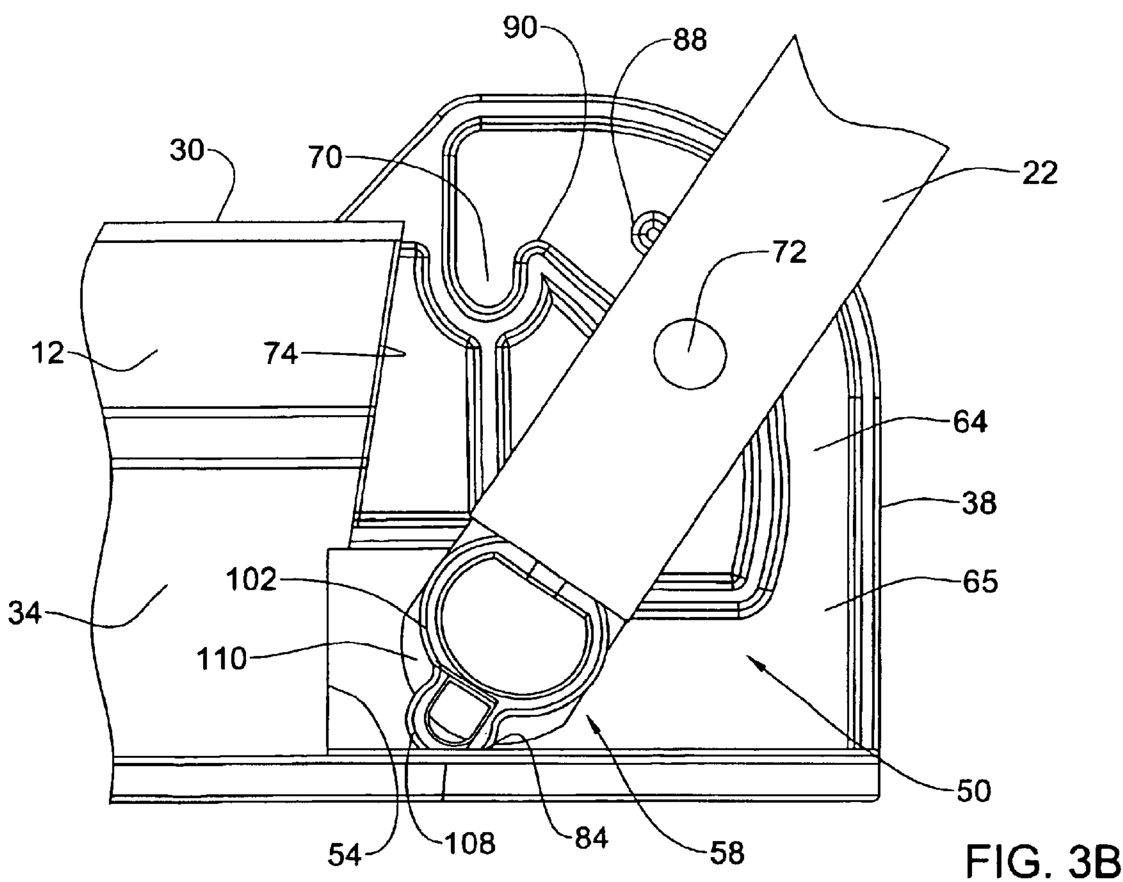
FIG. 3B is a side elevation of the portion marked III in FIG. 1B.
Figure 4:
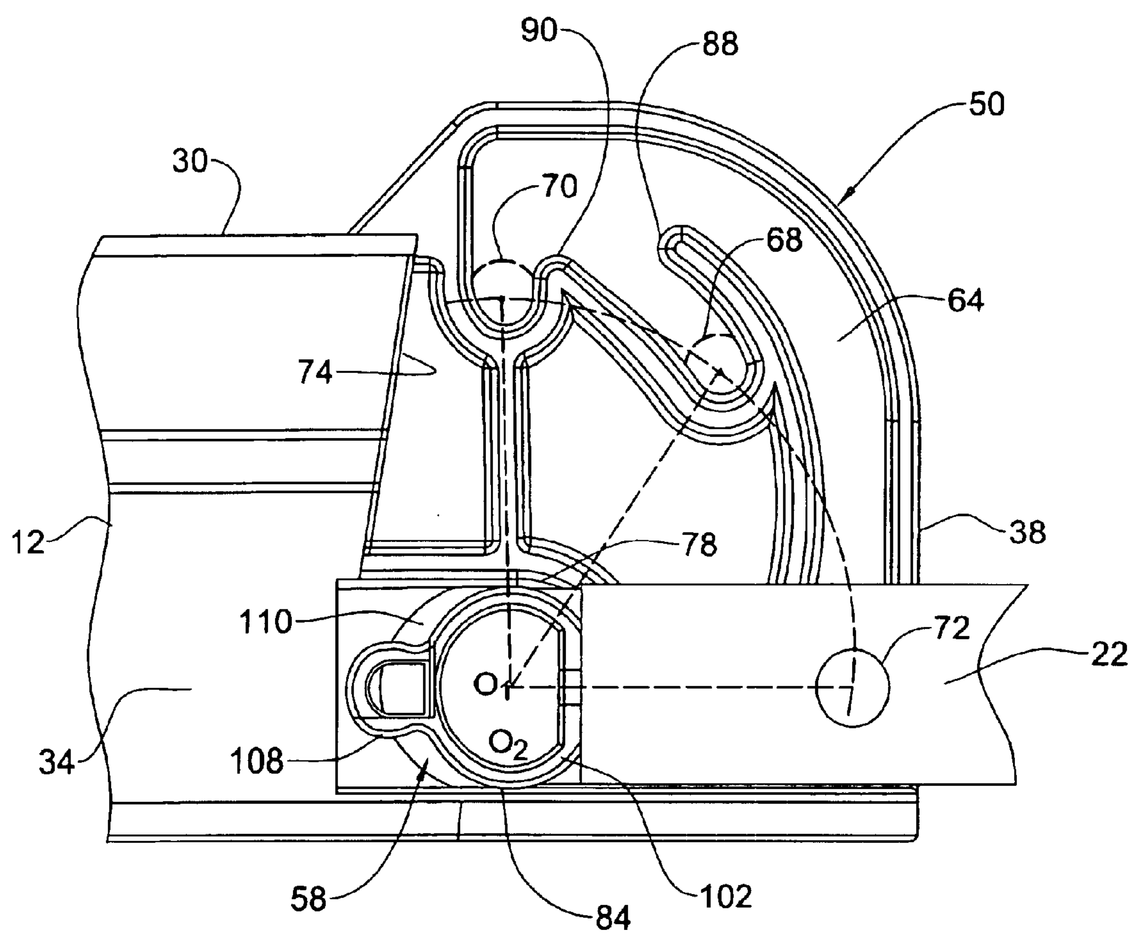
FIG. 4 is a side elevation of the portion marked IV in FIG. 1C.

Further attention is now directed to FIGS. 2 to 4 showing a rear portion of the hand truck 10 and in particular an arm connector generally designated 50 at a rear end of each side wall 34. It is further noticed that extending parallel and adjacent each of the side walls 34 there is an arm receiving bore 54 for slidingly receiving the arms 22 (FIG. 1C), as will be explained hereinafter in more detail. Typically, the bores (only one seen) 54 are parallel with one another.

Arm connector 50 comprises an arm coupler 58 and an arced path 64 extending from a lower end 65 opposite and in continuation with the arm receiving bore 54 and formed with a first pin arresting recess 68 and a second pin arresting recess 70, for arresting a position pin 72 of an arm 22 of the handle, as will be explained hereinafter. Preferably, the same arrangement is occurs at an opposite side of the platform, not seen.

Each arm connector 50 further comprises an arm supporting portion 74 in the form of a flat wall surface designed such that when the handle 18 is in its upright position (FIGS. 1A, 2A and 2B), a corresponding portion of the handle bears against the arm supporting portion 74, as can best be seen in FIG. 28.

Arm coupler 58 comprises two arresting locations—a first arresting location designated 78 in the form of an arced surface for bearing engagement with a corresponding first pivot joint 102 of a platform engaging assembly 100 (illustrated with further detail in FIGS. 5A–5C), and a second arresting location 84 (best seen in FIGS. 2A and 28) for arresting a second pivot joint 108 of a platform engaging assembly 100 (illustrated hereinafter in more detail with reference FIGS. 5A–5C). It is further noticed, with particular reference to FIG. 4, that the first arresting location 78 serves as a stopper to restrict rearward displacement of the first pivot joint 102, to thereby prevent unintended withdrawal of arm 22 and of the handle 18 from the platform 12.

Figure 5A:
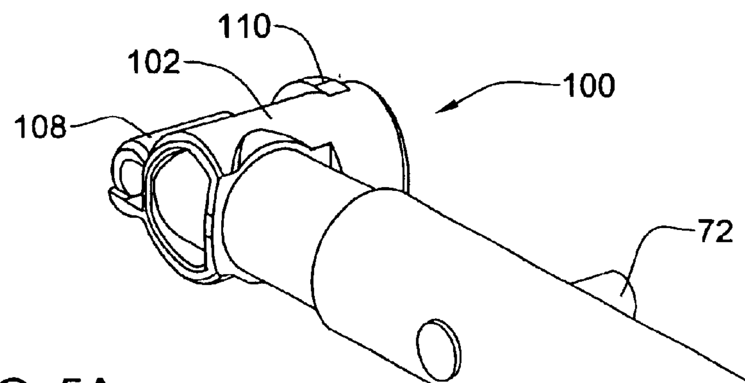
FIG. 5A is an isometric view of a lower end of an arm of the handle in its retracted position.
Figure 5B:
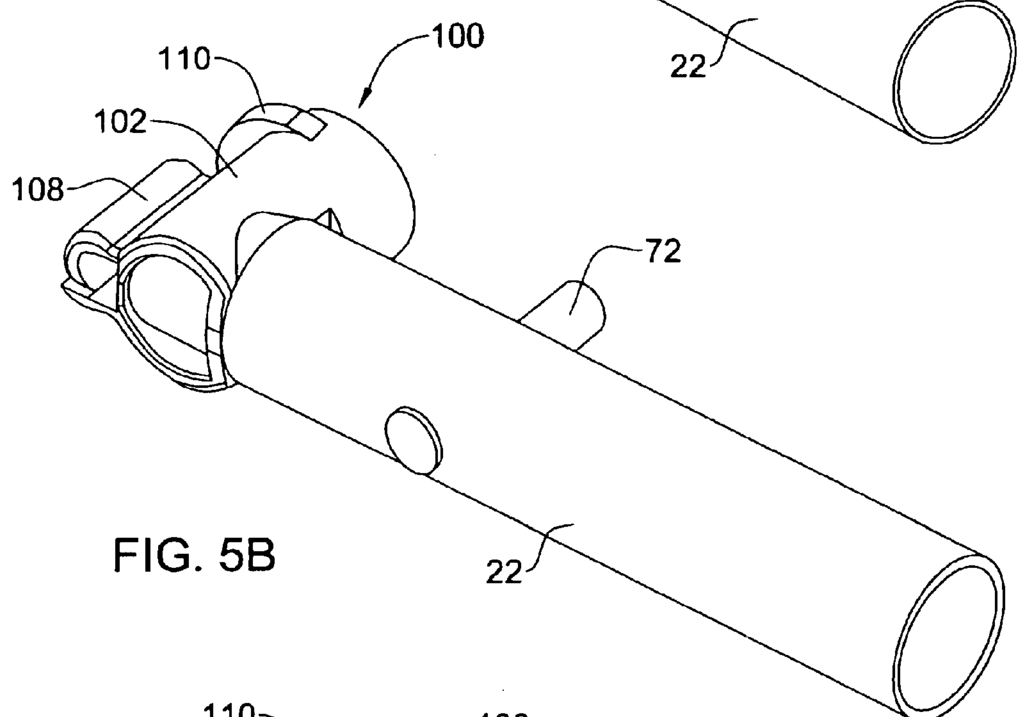
FIG. 5B illustrates the handle of FIG. 5A in its extracted position.
Figure 5C:
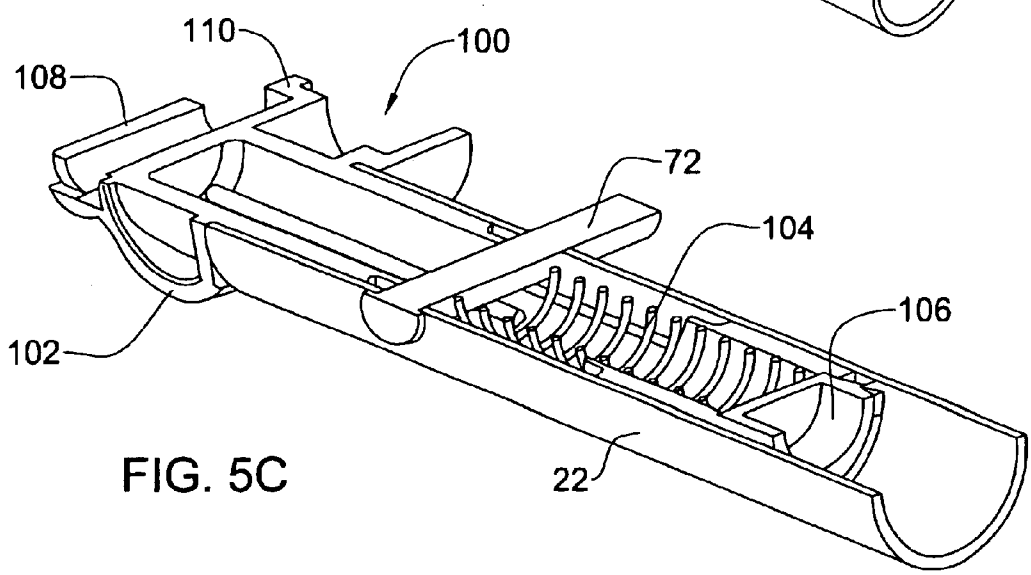
FIG. 5C is a sectional view of the arm portion seen in FIG. 5A.

Turning now to FIGS. 5A to 5C, there is illustrated a lower portion of arm 22 fitted with a telescopic, extractable platform engaging assembly 100 which is spring biased into its retracted position as in FIGS. 5B and 5C by means of coiled spring 104 received within the arm 22 and bearing at one end against a stopper plug 106 and at an opposed end against position pin 72. The platform engaging assembly 100 comprises a hinging member fitted with the first pivot joint 102 and a second pivot point 108, the operation of which will be explained in more detail hereinafter.

Figure 2A:
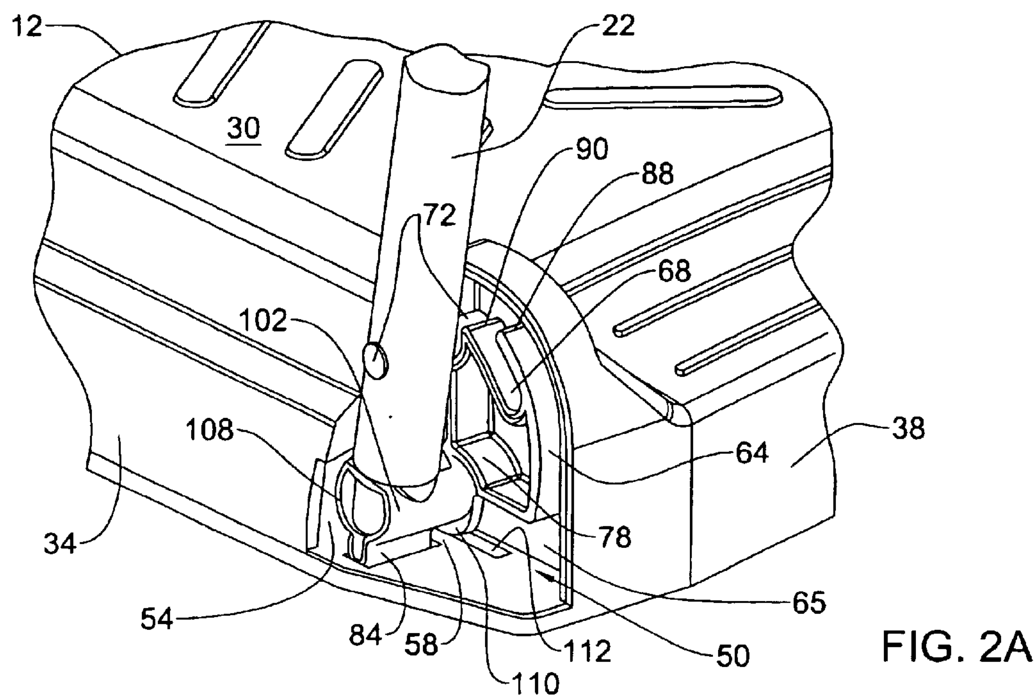
FIG. 2A is an enlargement of the portion marked II in FIG. 1A.

Platform engaging assembly 100 is formed with the first pivot joint 102 in the form of a cylindric portion having a diameter corresponding with the radius of the first arresting location 78 of arm coupler 58 (see FIG. 4) and further comprises the second pivot joint 108 in the form of a coaxial radial protrusion fitted for pivoting about the second arresting location 84 (recess 84 best seen in FIGS. 2A and 3A).

Reverting now to FIGS. 2 to 4, and in particular as illustrated in FIG. 4, the arced path 64 has an altering radius as measured from the first center of rotation $O_1$ of the first arresting location 78, such that at the horizontal position of arm 22 and at the first and second pin arresting recesses 68 and 70, respectively, the radius is essentially equal, such that the platform engaging assembly 100 is in its retracted position (as in FIGS. 5B and 5C) as will become apparent hereinafter. However, during shifting the handle 18 between positions, the position pin 72 travels within the arced path 64 over the peaks 88 and 90, entailing extraction of the platform engaging assembly 100 (as in FIG. 5A), whilst in this position the center of rotation is about $O_2$, namely about the second pivot joint 108.

The hinging member further comprises a bracket 110 swingingly receivable within a corresponding groove 112 formed at the arm connector 50 (FIGS. 2A and 3A) to prevent unintended lateral disengagement of the arms from the arm connectors.

Figure 2B:
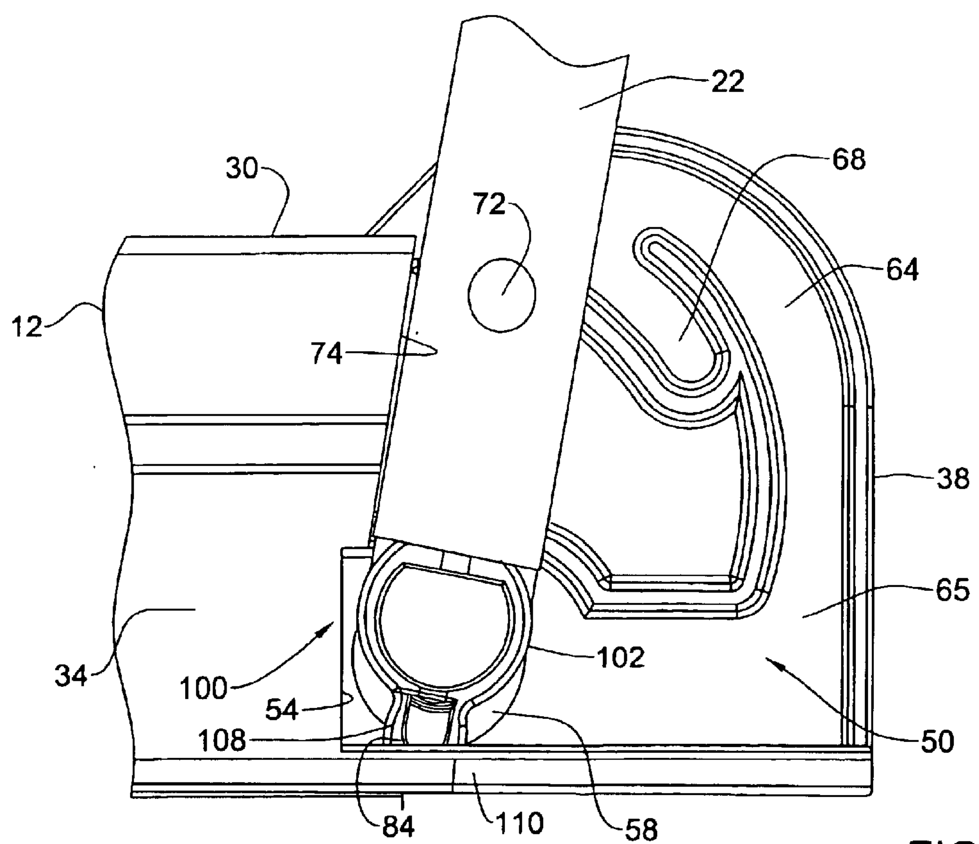
FIG. 2B is a side elevation of the portion marked II in FIG. 1A.

The hand track 10 may be used in three different positions, as follows:

I. The first is a pull/push position wherein the handle 18 is in an upright position as in FIGS. 1A and corresponding detailed FIGS. 2A and 2B, wherein pin 72 is arrested within the second pin arresting recess 70 and where a portion of arm 22 bears against arm supporting wall portion 74 and further wherein the second pivot joint 108 is arrested by the second arresting location 84. In this position, the aim extends at an angle of about 110 degrees with respect to the platform (FIG. 2B, 14). At this position the hand truck 10 may be pushed or pulled as per arrows 115 or 117, respectively, at user's choice.

II. The second is a pulling position as in FIG. 1B and corresponding detailed FIGS. 3A and 3B wherein the handle 18 is inclined, and where position pin 72 is arrested within the first pin arresting recess 68. In this position, the arm extends at an angle of about 120 degrees with respect to the platform (FIGS. 3A, 3B). This position is used for pulling the hand truck 10 as per arrow 119.

Ill. The third is a dolly position which is also used as a storage position, wherein the handle 18 is slidingly displaced such that arms 22 are received within the bores 54 of the platform 12 (FIG. 1C) and as shown at an initial stage before sliding displacement, in FIG. 4.

Shifting between positions is easily performed by pulling the handle 18 upwardly against the biasing effect of coiled spring 104 (FIG. 5C) to thereby extract the platform engaging assembly 100 such that the position pin 72 may ride over peaks 88 and 90 of the first and second pin arresting recesses 68 and 70, respectively. However, in the operative positions, where the pin 72 is either arrested by one of the pin arresting recesses 68 or 70 and in the dolly position, the hinging member is retracted by means of coiled spring 104.

In the dolly position (FIG. 1C) practically the entire length of arms 22 is received within the corresponding bores 54, with the platform engaging assembly 100 slidingly received at a fore end of the corresponding bore 54.

At the dolly position the hand truck 10 may be carried by openings 122 formed adjacent the side walls 34 of platform 12. In accordance with one particular embodiment (not illustrated), opening 122 partially intersects with the arm receiving bore 54 such that at the dolly position a portion of arm 22 may be gripped through the respective openings 122.

It is also noted in FIGS. 1A to 1C that the platform 12 is formed at a rear end thereof with a tow hole 127, which is useful for towing/pulling the platform when in the dolly position as in FIG. 1C. Towing is carried out by inserting a tow pole (not shown) into the tow hole 127 and pulling it, or by a rope (not shown) inserted into the tow hole. However, tow holes may be formed adjacent either or both a fore end and a rear end of the platform.

What is claimed is:

1. A hand truck comprising:

(a) a platform having a top item-receiving surface extending between two side walls and having a fore end and a rear end, said platform being formed with two parallel arm receiving recesses, extending along the side walls one adjacent each side wall; and said platform being fitted with an arm connector at a rear end of each side wall for pivotally connecting a handle arm; said platform further comprising several casters;

(b) a handle assembly comprising two parallel spaced handle arms, each coupled at its lower end with a corresponding platform engaging assembly so as to allow relative linear displacement between each platform engaging assembly and respective handle arm; said handle assembly being pivotally displaceable between three respective positions: a first position in which the handle arms are substantially up-right and which position is a pull/push position, a second position in which the handle arms are inclined and which position is useful as a push position, and a third position in which the handle arms are slidably displaceable along the side walls of the platform so as to be receivable within the arm receiving recesses of the platform.

2. A hand truck according to claim 1, wherein the handle is a U-shaped member.

3. A hand truck according to claim 1, wherein each platform engaging assembly is extractable from the respective handle arm and is spring biased to be in a retracted position.

4. A hand truck according to claim 1, wherein each arm connector is formed with an arm coupler and with an arced path formed with two pin arresting recesses for arresting a position pin of a respective handle arm, said recesses corresponding with the first and second positions of the handle assembly.

5. A hand truck according to claim 4, wherein each arm connector further comprises an arm supporting portion such that when the hand truck is pushed while the handle assembly is at its first position, a corresponding portion of the handle arm bears against the arm supporting portion.

6. A hand truck according to claim 5, wherein the arm supporting portion is a wall surface.

7. A hand truck according to claim 6, wherein at the first position, the handle arms of the handle assembly are parallel and in close proximity with the wall surface.

8. A hand truck according to claim 4, wherein each arced path extends from a lower end of the corresponding arm connector opposite and in continuation with a corresponding arm receiving recess of the platform.

9. A hand truck according to claim 4, wherein the arced path has an altering radius and wherein at least at a lower end thereof and either of at said pin arresting recesses, the radius is substantially invariant.

10. A hand truck according to claim 9, wherein the substantially invariant radius corresponds with a distance between the position pin of a respective arm of the handle assembly and a center of rotation of the platform engaging assembly.

11. A hand truck according to claim 4, wherein each platform engaging assembly comprises an extractable hinging member and each handle arm is fitted with a laterally projecting pin, said pin is slidable receivable within the arced path of the arm connector and is engageable with the corresponding pin arresting recess of the arced path.

12. A hand truck according to claim 11, wherein the hinging member is pivotally engageable by the arm coupler of the arm connector and said hinging member is slidable receivable within the corresponding arm receiving recess.

13. A hand truck according to claim 11, wherein the hinging member is spring biased into a retracted position with respect to a corresponding handle arm.

14. A hand truck according to claim 10, wherein the coupling between the arm coupler and the hinging member comprises a floating joint, such that the center of rotation of the platform engaging assembly spontaneously changes during shifting the handle assembly between its respective positions.

15. A hand truck according to claim 11, wherein each hinging member is provided with a first and a second pivot joint and the arm coupler of the arm connector comprises a first arresting location adapted for arresting the first pivot joint of the hinging member at either of the positions where the hinging member is retracted, and a second arresting location adapted for arresting the second pivot joint of the hinging member when the hinging member is extracted, and whereby the pivot joints of the hinging member spontaneously engage and disengage from the respective arresting locations of the arm connector upon shifting the handle assembly between its respective positions.

16. A hand truck according to claim 15, wherein the first arresting location is an arced surface of the arm connector and the corresponding first pivot joint is a mating cylindrical portion of the hinging member pivotally bearing against said arced surface; and the second arresting location is a joint nesting recess below said arced surface, said nesting recess pivotally receiving a pivot projection constituting the second pivot joint of the hinging member.

17. A hand truck according to claim 10, wherein at least one of the platform engaging assemblies of the handle assembly is fitted at its lower end with a bracket projecting from the first pivot joint and being pivotally engageable within a corresponding recess of the arm connector, so as to prevent unintended disengagement of the platform engaging assembly from the respective arm connector.

18. A hand truck according to claim 15, wherein the arm coupler of the arm connector comprises a stopper portion to restrict rearward displacement of the first pivot joint, to prevent unintended withdrawal of the handle assembly from the platform.

19. A hand truck according to claim 18, wherein the stopper portion is an arced surface of the arm connector, engageable with a mating cylindrical portion of the first pivot joint.

20. A hand truck according to claim 1, wherein at the first position the arm extends at an angle of about 110° with respect to the top surface of the platform and at the second position the handle arms extends at an angle of about 120° with respect to the top surface of the platform.

21. A hand truck according to claim 1, wherein the platform is provided with at least two hand grips, said grips being openings formed adjacent the side walls of the platform.

22. A hand truck according to claim 21, wherein the openings communicate with the arm receiving recesses such that when the handle arms are received within the platform at the third position, they may be gripped through the respective opening.

23. A hand truck according to claim 1, wherein the platform is provided with a several hooks for attaching thereto a tying strap.

24. A hand truck according to claim 1, wherein the platform is formed with at least one tow hole formed adjacent a fore or rear end of the platform.

25. A hand truck according to claim 1, wherein the platform is formed with two or more hooks for securing the load or items placed on the top surface of the platform by BUNGEE cord or tying cord.

26. A hand truck comprising a platform fitted with casters and at either of the opposed side walls thereof with an arm connector, and a handle assembly comprising two parallel spaced handle arms, each fitted at its lower end with a platform engaging assembly; each platform engaging assembly being coupled with the respective handle arm with possibility for relative linear displacement therebetween; said handle assembly being displaceable between three respective positions: a first position in which the handle arms are substantially up-right and which position is a pull/push position, a second position in which the handle arms are inclined, said second position being useful as a push position, and a third position in which the handle arms are slidably displaceable along the side walls of the platform so as to be receivable within the platform.

27. A hand truck according to claim 26, wherein the platform is formed with two parallel bores, each extending along and adjacent a corresponding side wall, from a rear end thereof, said bores are adapted for slidingly accommodating the arms of the handle assembly.

28. A hand truck comprising a platform fitted with casters, and a handle assembly comprising two parallel spaced handle arms, each handle arm fitted at a lower end with a platform engaging assembly; said handle assembly being displaceable between a substantially up-right position and which position being a pull/push position, an inclined pulling position, and a dolly position in which the handle arms are slidably receivable within the platform, wherein the platform comprises an arm connector situated at a rear end of each platform side wall, each arm connector is formed with an arm coupler and an arced path formed with two pin arresting recesses for arresting a position pin of a respective handle arm, said recesses corresponding with the first and second positions of the handle assembly.

29. A hand truck according to claim 28, wherein the platform is formed with two parallel bores, each extending along and adjacent a corresponding platform side wall, from a rear end thereof, for slidingly receiving the handle arms when the handle assembly is at the dolly position.

30. A hand truck according to claim 28, wherein each arm connector further comprises an arm supporting portion such that when the handle assembly of the truck is pushed while the handle assembly is at its upright position, a corresponding portion of the handle arm bears against the arm supporting portion.

31. A hand truck according to claim 28, wherein the arced path extends from a lower end of the arm connector opposite and in continuation with a corresponding arm receiving bore of the platform.

32. A hand truck according to claim 28, wherein the arced path has an altering radius and wherein at least at a lower end thereof and at said two pin arresting recesses, the radius is substantially invariant.

33. A hand truck according to claim 32, wherein the substantially invariant radius corresponds with a distance between the position pin of a respective handle arm and a center of rotation of the platform engaging assembly.

34. A hand truck according to claim 28, wherein each platform engaging assembly comprises a hinging member and each handle arm is fitted with a laterally projecting pin slidable within the arced path and engageable with the pin arresting recesses at either of the respective first and second positions of the handle assembly.

35. A hand truck according to claim 34, wherein the coupling between the arm coupler and the hinging member is a floating joint, such that the center of rotation of the hinging member spontaneously changes during shifting the handle assembly between its respective positions.

36. A hand truck according to claim 34, wherein the hinging member is provided with a first and a second pivot joint and an arm coupler of the arm connector comprises a first arresting location adapted for arresting the first pivot joint at either of the positions where the hinging member is retracted, and a second arresting location adapted for arresting the second pivot joint when the hinging member is extracted, and whereby the pivot joints of the hinging member spontaneously engage and disengage from the respective arresting locations upon shifting the handle assembly between its respective positions.

37. A hand truck according to claim 28, wherein the platform is formed with at least one tow hole formed adjacent a fore or rear end of the platform.

38. A hand truck according to claim 28, wherein the platform is formed with two or more hooks for securing the load or items placed on the platform by BUNGEE cord or tying cord.

* * * * *